United States Patent
Nishida et al.

(10) Patent No.: US 10,024,267 B2
(45) Date of Patent: Jul. 17, 2018

(54) COMBUSTION CHAMBER STRUCTURE FOR INTERNAL COMBUSTION ENGINE

(75) Inventors: Kentaro Nishida, Susono (JP); Hiroshi Oyagi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/365,170

(22) PCT Filed: Dec. 16, 2011

(86) PCT No.: PCT/JP2011/079235
§ 371 (c)(1),
(2), (4) Date: Jun. 13, 2014

(87) PCT Pub. No.: WO2013/088575
PCT Pub. Date: Jun. 20, 2013

(65) Prior Publication Data
US 2014/0331957 A1 Nov. 13, 2014

(51) Int. Cl.
*F02F 3/00* (2006.01)
*F02F 1/00* (2006.01)
*F02B 23/06* (2006.01)

(52) U.S. Cl.
CPC .............. *F02F 1/00* (2013.01); *F02B 23/069* (2013.01); *F02B 23/0621* (2013.01); *F02B 23/0624* (2013.01); *F02B 23/0696* (2013.01); *F02B 23/0693* (2013.01); *Y02T 10/125* (2013.01)

(58) Field of Classification Search
CPC .... F02B 1/04; F02B 2275/40; F02B 23/0621; F02B 23/0624; F02B 23/0693; F02B 23/0696; F02F 3/00

USPC .................................. 123/193.1, 193.6, 661
See application file for complete search history.

(56) References Cited

U.S. PATENT DOCUMENTS

| | | | | |
|---|---|---|---|---|
| 3,954,089 A | * | 5/1976 | Hardesty | F02B 23/0624 123/261 |
| 4,207,843 A | * | 6/1980 | List | F02B 23/0636 123/261 |
| 4,300,498 A | * | 11/1981 | May | F02B 23/0636 123/263 |

(Continued)

FOREIGN PATENT DOCUMENTS

| | | |
|---|---|---|
| JP | 59-157535 U | 10/1984 |
| JP | 63-094020 A | 4/1988 |

(Continued)

*Primary Examiner* — Lindsay Low
*Assistant Examiner* — Omar Morales
(74) *Attorney, Agent, or Firm* — Hunton Andrews Kurth LLP

(57) ABSTRACT

A combustion chamber structure for an internal combustion engine includes, in a piston top part, a concave portion formed eccentrically with respect to a cylinder center axis, and a tapered portion that connects an upper end face of the piston top part and a side face of the concave portion. The tapered portion is formed so that a tapered portion volume (volume of a space formed between the tapered portion and an upper wall surface of the combustion chamber) in a first portion of the piston top part is greater than a tapered portion volume in a second portion that is nearer than the first portion to an eccentric direction of the concave portion from the cylinder center axis.

3 Claims, 5 Drawing Sheets

(56) References Cited

U.S. PATENT DOCUMENTS

| | | | | |
|---|---|---|---|---|
| 5,269,270 A | * | 12/1993 | Suzuki | F01L 1/267 |
| | | | | 123/193.5 |
| 5,771,872 A | | 6/1998 | Ueda et al. | |
| 6,314,933 B1 | | 11/2001 | Iijima et al. | |

FOREIGN PATENT DOCUMENTS

| | | |
|---|---|---|
| JP | 03-210021 A | 9/1991 |
| JP | 09-280052 A | 10/1997 |
| JP | 2000-220520 A | 8/2000 |
| JP | 2012-021512 A | 2/2012 |

\* cited by examiner

[FIG. 1]
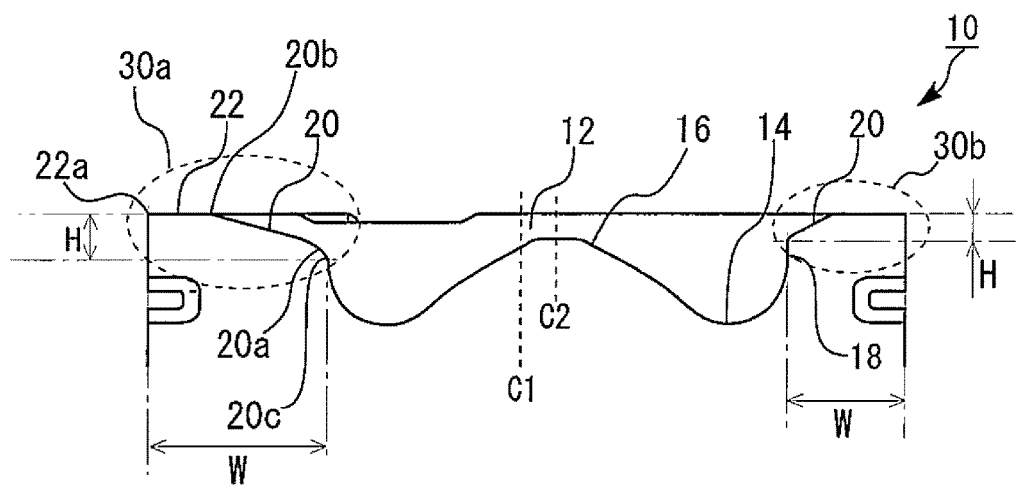
[FIG. 2]
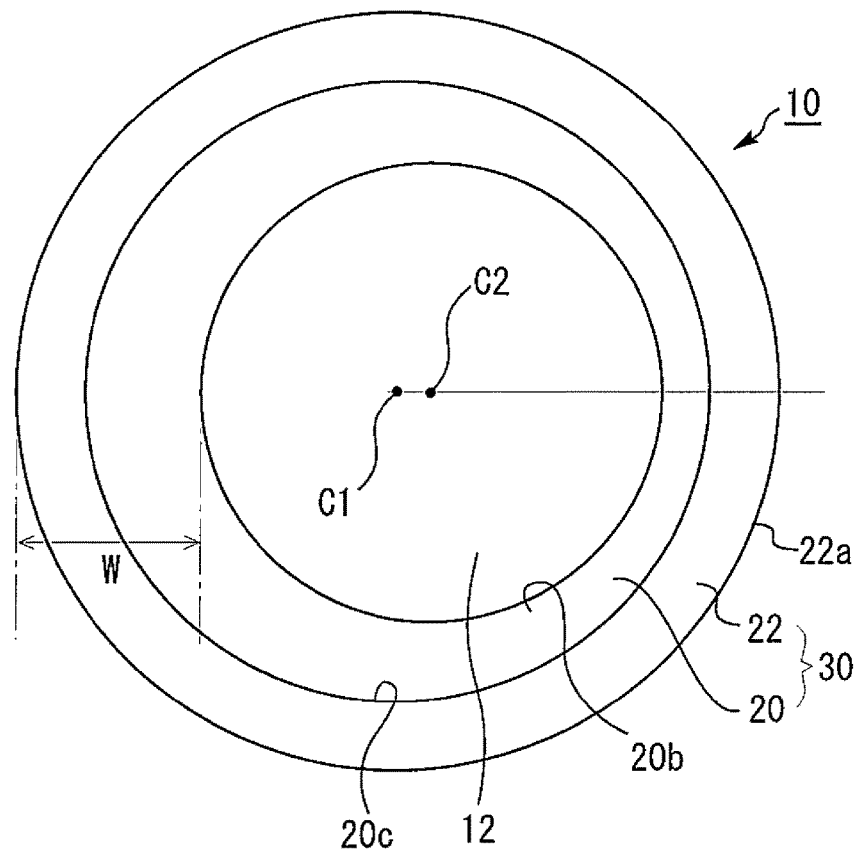

[FIG. 3]
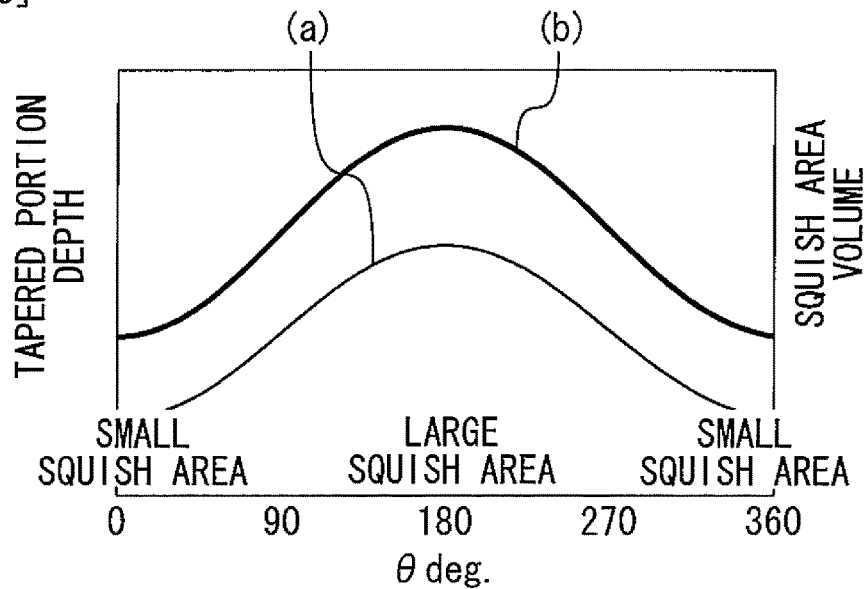
[FIG. 4]
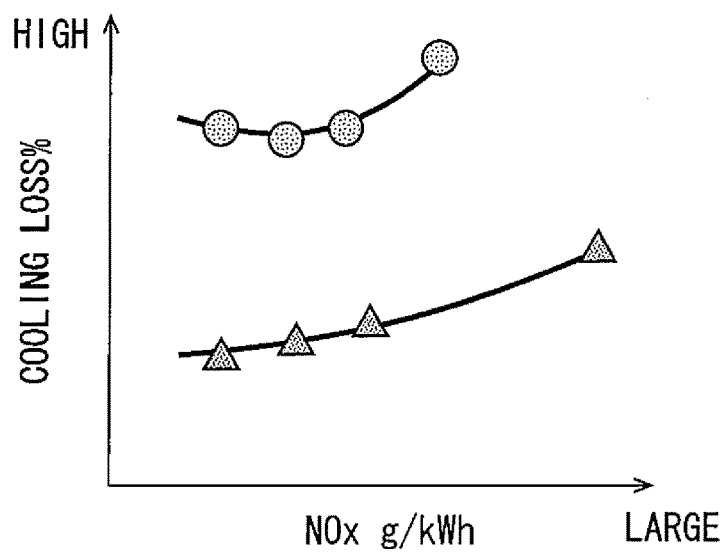

[FIG. 5]
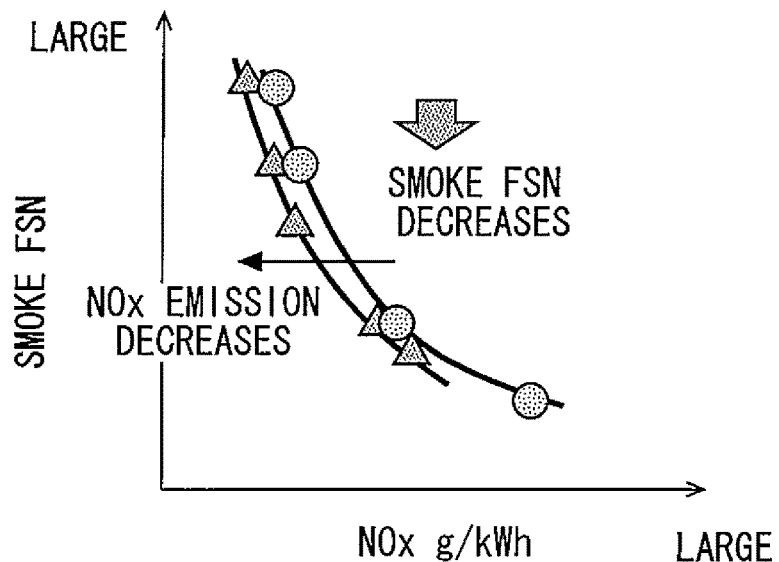
[FIG. 6]
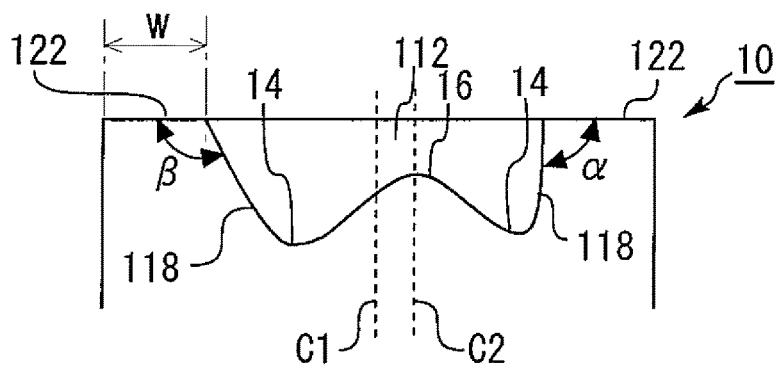
[FIG. 7]
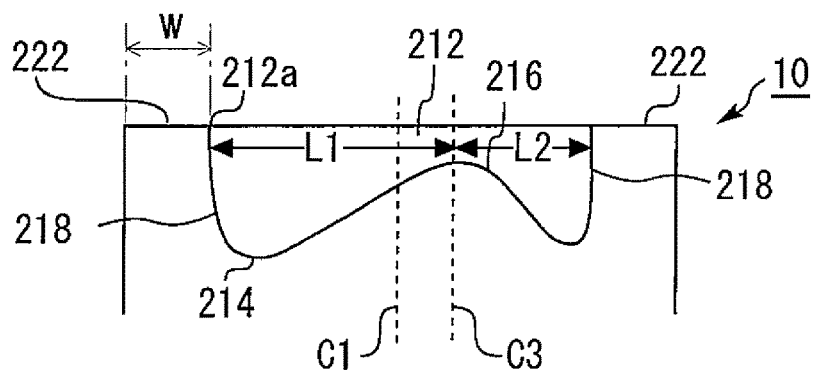

[FIG. 8]
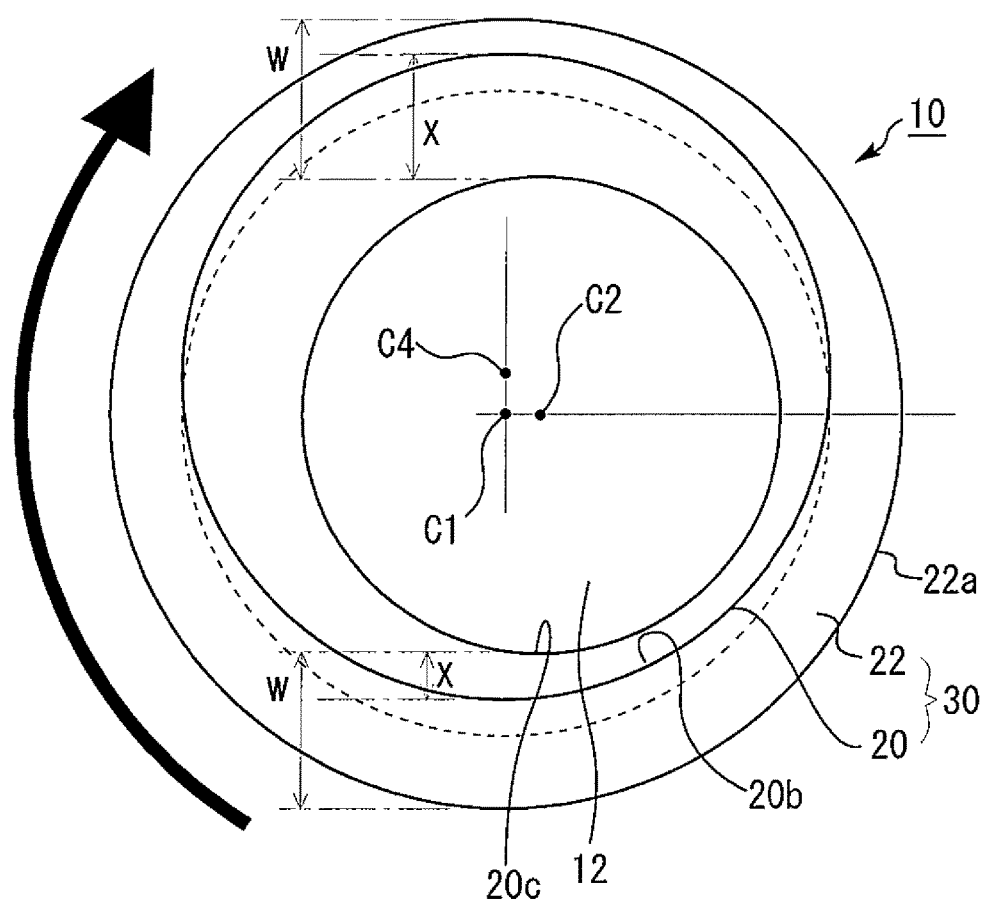

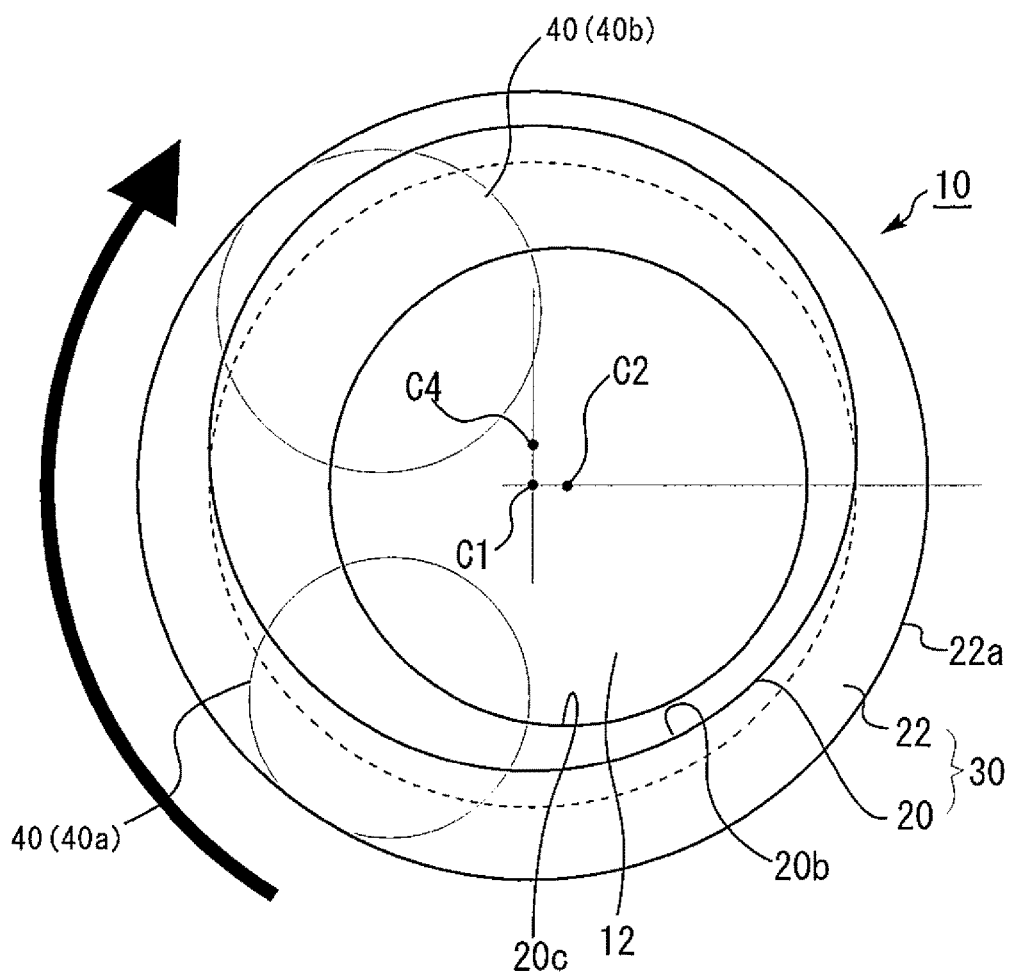
[FIG. 9]

COMBUSTION CHAMBER STRUCTURE FOR INTERNAL COMBUSTION ENGINE

CROSS-REFERENCE TO RELATED APPLICATIONS

This is a national phase application based on the PCT International Patent Application No. PCT/JP2011/079235 filed on Dec. 16, 2011, the entire contents of which are incorporated herein by reference.

TECHNICAL FIELD

The present invention relates to a combustion chamber structure for an internal combustion engine.

BACKGROUND ART

A combustion chamber structure for an internal combustion engine is known in which a shallow-dish type concave portion is formed in the top face of a piston, and a conical protrusion is formed on the bottom face of the concave portion. Further, for example, in Patent Literature 1 a combustion chamber structure is disclosed that is arranged so as to be eccentric with respect to a center axis of a cylinder. In Patent Literature 1, a combustion chamber is formed so that a diameter thereof decreases in the upward directions, that is, so that a side face of the combustion chamber inclines towards the center. Further, a lip portion at an upper end that continues to the side face of the combustion chamber is subjected to a rounding process. The lip portion is formed at a lower position than the upper end face of the piston, and a tapered face is formed from the lip portion to the upper end face of the piston.

CITATION LIST

Patent Literature

Patent Literature 1: Japanese Patent Laid-Open No. 03-210021
Patent Literature 2: Japanese Utility Model Laid-Open No. 59-157535
Patent Literature 3: Japanese Patent Laid-Open No. 63-094020
Patent Literature 4: Japanese Patent Laid-Open No. 2000-220520
Patent Literature 5: Japanese Patent Laid-Open No. 09-280052

SUMMARY OF INVENTION

Problem to be Solved by the Invention

According to the configuration disclosed in Patent Literature 1, a concave portion that constitutes the combustion chamber is arranged eccentrically from the cylinder center, and the tapered portion that is formed from the lip portion is also formed symmetrically with respect to an outer circumferential portion of the concave portion. Consequently, differences arise with respect to the sizes of squish areas in this combustion chamber structure. When a difference exists in the sizes of the squish areas, excess fuel is liable to exist in a region in which the squish area is small and excess air is liable to exist in a region in which the squish area is large. As a result, a situation can occur in which the air utilization rate decreases. Further, since an imbalance arises in the flow inside the cylinder as a result of the imbalance in the squish areas, and in particular since the gas flow velocity quickens on the side of the large squish area, the cooling loss is liable to increase.

Accordingly, an object of the present invention is to solve the above described problem and provide a combustion chamber structure for an internal combustion engine that is improved so that the air utilization rate can be improved while homogenizing the gas flow inside a cylinder and reducing cooling loss even in a case where a concave portion of a combustion chamber is arranged eccentrically from a cylinder center axis.

Means for Solving the Problem

To achieve the above described object, the present invention provides a combustion chamber structure for an internal combustion engine, comprising: a concave portion that is formed in a piston top part in an eccentric manner relative to a cylinder center axis; and a tapered portion that connects an upper end face of the piston top part and a side face of the concave portion. The tapered portion is formed so that a tapered portion volume in a first portion of the piston top part is greater than a tapered portion volume in a second portion that is nearer than the first portion to an eccentric direction of the concave portion from the cylinder center axis. Note that the tapered portion volume is a volume of a space formed between the tapered portion and a combustion chamber upper wall surface.

In the present invention, the tapered portion may be informed so that a tapered portion depth in the first portion is greater than a tapered portion depth in the second portion. Note that the tapered portion depth is a distance from a face of a same height as the upper end face of the tapered portion.

In the present invention, the tapered portion may be informed so that a tapered portion width in the first portion is greater than a tapered portion width in the second portion. Note that a tapered portion width is a distance in a planar direction perpendicular to the cylinder center axis from an outer edge portion of the tapered portion that is a boundary portion between the tapered portion and the upper end face to an inner edge portion of the tapered portion that is a boundary portion between the tapered portion and the side face of the concave portion.

In the present invention, the tapered portion may be informed so that the tapered portion volume in a third portion of the piston top part is greater than the tapered portion volume in a fourth portion in which a flow velocity of a swirl flow that flows into the combustion chamber is slower than in the third portion.

The present invention may be applied to a combustion chamber structure in which two intake valves having mutually different diameters are arranged. In this case, two valve recesses are assumed to be formed in the piston top part in correspondence with the two intake valves, respectively. And, among the two valve recesses, a region in which a larger valve recess corresponding to an intake valve having a larger diameter is formed may be a region in which a flow velocity of a swirl flow becomes faster than in a region in which a smaller valve recess corresponding to an intake valve having a smaller diameter is formed.

Advantageous Effects of Invention

In a case where a cavity that is a concave portion constituting a combustion chamber that is formed in a piston top part is arranged eccentrically with respect to a cylinder center axis, the surface area of a squish area is greater in a region in an opposite direction to the eccentric direction of the cavity in comparison to a region that is near to the eccentric direction. However, in this respect, according to the present invention, in comparison to a portion that is near (second portion) the eccentric direction of the cavity, a larger tapered portion volume is secured at a portion (first portion) that is far from the eccentric direction, that is, a portion at which the squish area is larger. Consequently, it is possible to promote leading of the air-fuel mixture into a large squish area and decrease residual air therein, and thus the air utilization rate can be improved. Further, the overall flow of gas can be homogenized and a cooling loss can be reduced.

BRIEF DESCRIPTION OF DRAWINGS

FIG. 1 is a view for describing a constitution of a piston top face part according to Embodiment 1 of the present invention.

FIG. 2 is a view for describing the constitution of the piston top face part according to Embodiment 1 of the present invention.

FIG. 3 is a view for describing a tapered portion depth and volume of a squish area 30 with respect to a squish area width of the piston in the present Embodiment 1.

FIG. 4 is a view for describing a cooling loss with respect to the amount of NOx emissions in relation to the combustion chamber structure of Embodiment 1 of the present invention.

FIG. 5 is a view for describing the amount of smoke emission with respect to the amount of NOx emission according to the combustion chamber structure of Embodiment 1 of the present invention.

FIG. 6 is a view for describing an example of another shape of the piston of Embodiment 1 of the present invention.

FIG. 7 is a view for describing an example of another shape of the piston of Embodiment 1 of the present invention.

FIG. 8 is a view for describing a constitution of a piston top face part according to Embodiment 2 of the present invention.

FIG. 9 is a view for describing a constitution of a piston top face part according to Embodiment 3 of the present invention.

DESCRIPTION OF EMBODIMENTS

Embodiments of the present invention are described hereunder with reference to the accompanying drawings. For each of the drawings, the same or corresponding portions are denoted by the same reference numerals, and a description of such portions is simplified or omitted.

Embodiment 1

FIG. 1 and FIG. 2 are views for describing a piston according to Embodiment 1 of the present invention. FIG. 1 is a view that includes a cylinder center axis C1 of the piston, and shows a cross-section in a direction parallel to the cylinder center axis C1. FIG. 2 is a view that shows a top face of a piston top part as viewed from above (that is, from the upper direction on the paper surface in FIG. 1). A piston 10 of the present Embodiment 1 is mounted inside each cylinder of a diesel engine and used, and constitutes a combustion chamber that takes a cylinder head as an upper wall surface inside each cylinder.

As shown in FIG. 1, the piston 10 includes a cavity 12 that is a space constituting a combustion chamber, which is formed in a concave shape in a top part of the piston 10. A protruding portion 16 that protrudes in a conical shape towards a center portion of the cavity 12 is provided in a bottom face 14 of the cavity 12. The bottom face 14 of the cavity 12 continues gradually into a side face 18 via a curved face 14a. The side face 18 of the cavity 12 is a wall surface that extends in an upward direction approximately parallel to the direction of the cylinder center axis C1.

In the present Embodiment 1, the center axis C1 of the cylinder is arranged in a state in which the center axis C1 deviates from a center C2 of the cavity 12. In FIG. 1 and FIG. 2, the center axis C1 of the cylinder is formed eccentrically in the right direction in the figures. Hereunder, a direction from the cylinder center axis C1 towards the cavity center C2 (right direction in the figures) is also referred to as an "eccentric direction of the cavity 12".

The side face 18 of the cavity 12 continues into a tapered portion 20 formed in a top part of the piston 10, via a round-shaped curved face 20a of the tapered portion 20. The tapered portion 20 continues into an upper end face 22 of the top part of the piston 10. That is, the tapered portion 20 including the curved face 20a is a face that connects the upper end face 22 that is the upper end face of the piston 10 and the side face 18 of the cavity 12, and is a face that is diagonally formed with respect to a horizontal plane of the cylinder (that is, a plane perpendicular to the cylinder center axis C1).

When the piston 10 is viewed from above as shown in FIG. 2, a boundary line between the tapered portion 20 and the upper end face 22, namely, an outer edge portion 20b of the tapered portion 20, is formed so that the center thereof is located at the same position as the center axis C1 of the cylinder.

In the following embodiments, a squish area 30 is a clearance between the top part of the piston 10 and a cylinder head (not shown in the drawings) that can be formed in an area that is located further to the outer circumferential side than the cavity 12 when the piston 10 reaches top dead center. That is, according to the present Embodiment 1, a space between the upper end face 22 and tapered portion 20 and the cylinder head corresponds to the squish area 30.

Further, in the following embodiments, the term "depth" refers to a distance in the cylinder center axis C1 direction, and the term "width" refers to a distance in the direction of a horizontal plane that is a plane perpendicular to the cylinder center axis C1. A tapered portion depth H represents a distance in the vertical direction to the upper end face 22 from each point on an inner edge portion 20c of the tapered portion 20 that is a boundary line between the curved face 20a of the tapered portion 20 and the side face 18. In addition, it is assumed that the term "squish area width W" refers to a shortest distance in the horizontal direction between the inner edge portion 20c of the tapered portion 20 and an outer circumferential circle 22a of the upper end face 22.

Hereunder, the configuration of the squish area 30 of the piston 10 of the present Embodiment 1 is described. FIG. 3 is a view for describing the tapered portion depth H and the volume of the squish area 30 with respect to the squish area width W of the piston 10 in the present Embodiment 1. In FIG. 3, the horizontal axis represents an angle θ, the vertical axis represents the tapered portion depth H or the volume of the squish area 30, a curve (a) represents the tapered portion depth H, and a curve (b) represents the volume of the squish area 30. In FIG. 3, the angle θ is an angle in a case where the apex angle is taken as the cavity center C2 and a line obtained by extending a line segment connecting the cylinder center axis C1 and the cavity center C2 in the eccentric direction is assumed to have an angle θ=0 degrees.

Since the cavity 12 is eccentric in a direction in which θ=0 degrees, as shown in FIG. 3, the squish area width W that is the width of a portion located further on an outer side relative to the cavity 12 of the top part of the piston 10 reaches a maximum when θ=180 degrees, gradually decreases towards a side on which θ=0 degrees (or 360 degrees), and reaches a minimum when θ=0 degrees (or 360 degrees).

The outer edge portion 20b of the tapered portion 20 is formed so as to be concentric with the cylinder center axis C1, and the cavity 12 is eccentric in a direction in which θ=0 degrees with respect to the cylinder center axis C1. Accordingly, the width of the piston upper end face 22 is uniform overall. On the other hand, with respect to the width of the tapered portion 20, a horizontal distance between the outer edge portion 20b and the inner edge portion 20c also reaches a minimum width when θ=0 degrees (or 360 degrees) that is the eccentric direction thereof, and gradually increases towards the side on which θ=180 degrees in an opposite direction to the eccentric direction, and reaches a maximum width when θ=180 degrees.

In addition, according to the present Embodiment 1, as shown by the curve (a) in FIG. 3, the tapered portion depth H is formed so gradually deepen as the squish area width W increases. That is, the tapered portion depth H is at a minimum when θ=0 degrees (or 360 degrees), and gradually increases in the direction in which θ=180 degrees, and reaches a maximum depth when θ=180 degrees.

That is, according to the present Embodiment 1, the tapered portion depth H and the width of the tapered portion 20 are both formed so as to increase as the width W of the squish area increases. Therefore, as shown by the curve (b), the volume of the squish area 30 also increases as the squish area width W increases. In other words, the width and depth of the tapered portion 20 at a certain portion (first portion) of the piston top part are larger than the width and depth of the tapered portion 20 at another portion (second portion) that is nearer to the eccentric direction (θ=0 degrees) than the certain portion. Accordingly, the tapered portion volume of the certain portion (first portion) is greater than the tapered portion volume of the other portion (second portion), and the squish area volume of the certain portion (first portion) is greater than the squish area volume of the other portion (second portion).

According to the combustion chamber structure of the present Embodiment 1 that is configured as described above, a larger tapered portion 20 is provided in the larger squish area 30. Therefore, the flow velocity of an air-fuel mixture in a large squish area 30a can be decreased. Accordingly, a heat transfer coefficient can be lowered and a cooling loss caused by a rise in the temperature of the piston 10 or the like can be decreased.

Further, the tapered portion 20 is configured to be deeper on the large squish area 30a side on which the amount of residual air is liable to become large. Consequently, it is possible to promote leading of the air-fuel mixture to the large squish area 30a and thereby improve the air utilization rate.

FIG. 4 is a view for describing a cooling loss with respect to the amount of NOx emissions in relation to the combustion chamber structure of Embodiment 1 of the present invention. In FIG. 4, the horizontal axis represents the amount of NOx emission (g/kWh) and the vertical axis represents the cooling loss (%). A line plotted with triangle symbols represents the case of the combustion chamber structure according to the present Embodiment 1, and for comparison, a combustion example in the case of the conventional combustion chamber structure is represented by a line plotted with circle symbols. From FIG. 4, it is verified that in comparison to the conventional combustion chamber structure, cooling loss is significantly decreased when using the combustion chamber structure of the present Embodiment 1.

FIG. 5 is a view for describing the amount of smoke emission with respect to the amount of NOx emission according to the combustion chamber structure of Embodiment 1 of the present invention. In FIG. 5, the horizontal axis represents the amount of NOx emission (g/kwh) and the vertical axis represents the amount of smoke emission FSN. A line plotted with triangle symbols represents the case of the combustion chamber structure according to the present Embodiment 1, and for comparison, a combustion example in the case of a combustion chamber structure having the conventional shape is represented by a line plotted with circle symbols. From FIG. 5, it is verified that in comparison to the conventional combustion chamber structure, NOx emissions and smoke emissions are both reduced when using the combustion chamber structure of the present Embodiment 1.

Note that, in FIG. 1 and FIG. 2 of the present Embodiment 1 a case is described in which the tapered portion 20 and the side face 18 are connected by a round-shaped curved face 20a. By providing the curved face 20a in this manner, a temperature rise at the edge portion can be effectively suppressed, and improvement of cooling loss and prevention of deformation and melting loss of the piston can be achieved. However, the present Embodiment 1 is not limited thereto, and a configuration may also be adopted in which the tapered portion 20 and the side face 18 are connected in an angulated state by a flat surface, and which does not have the curved face 20a that has been processed in a round shape.

Further, according to the present Embodiment 1, a case has been described in which both the width and the depth H of the tapered portion 20 are configured to increase as the squish area 30 increases and, consequently, the squish area volume also increases as the squish area width W increases. However, the present invention is not limited thereto, and for example, a configuration may also be adopted so that, as the width W of the squish area 30 increases, only the tapered portion depth H deepens and the width of the tapered portion 20 is uniform or is varied independently of the squish area width W. Further, a configuration may also be adopted in which, as the squish area width W increases, only the width of the tapered portion 20 widens and the tapered portion depth H is uniform or the depth changes independently of the squish area width W. Even when such configurations are adopted, as the squish area width W increases, the volume of the squish area 30 can be increased and thus the air utilization rate can be improved and smoke emissions can be reduced. The same also applies to the embodiments described below.

Further, according to the present Embodiment 1, a case was described in which the center of the outer edge portion 20b of the tapered portion 20 is configured so as to match the cylinder center axis C1. However, the present invention is not limited thereto, and a configuration may also be adopted in which the cylinder center axis C1 and the center of the outer edge portion 20b of the tapered portion 20 deviate relative to each other. Further, the outer edge portion 20b of the tapered portion 20 is not limited to an edge portion that is formed in a circular shape when viewing the top part of the piston 10 from above, and for example, may be formed in an elliptical shape. In the case of these configurations also, by forming the tapered portion 20 so that the width of the tapered portion 20 and/or the tapered portion depth increase in a region in which the squish area width W is large, a large volume can be secured with respect to the squish area 30. As a result, the air utilization rate can be improved and the amount of smoke emission can be reduced. The same also applies to the embodiments described below.

Furthermore, according to the present Embodiment 1 a case has been described in which the volume of the squish area 30 is designed to gradually increase by gradually increasing the tapered portion depth H and the width of the tapered portion 20 as the squish area 30 increases. However, according to the present invention, a change in the volume of the squish area 30 is not limited thereto, and a configuration may also be adopted in which the width or depth H of the tapered portion and the volume of the squish area 30 change in a stepwise manner with respect to each region. That is, a configuration may be adopted in which the tapered portion depth H and/or width in a certain region (first portion) in which the squish area 30 is large is formed to be large in comparison to the tapered portion depth H and/or width in another region (second region) in which the squish area 30 is smaller than in the certain region. The same also applies to the embodiments described below.

In addition, according to the present Embodiment 1, a case has been described in which the squish area volume is designed to increase in accordance with an increase in the squish area width W by forming the tapered portion 20 so that the tapered portion depth H and the width of the tapered portion 20 increase in accordance with an increase in the squish area width W. However, in the present invention the configuration of the squish area 30 is not limited to the aforementioned configuration and, for example, a configuration may be adopted in which the squish area width W is made uniform overall.

FIG. 6 and FIG. 7 are views for describing an example of another shape of the piston 10 of Embodiment 1 of the present invention. In the example illustrated in FIG. 6, the tapered portion 20 is not provided as in FIG. 1, and a side face 118 of a cavity 112 is directly connected to an upper end face 122 of the piston 10. According to this example, an angle of the side face 118 of the cavity 112 is changed so that the squish area width W, that is, the width of the upper end face 122, is the same size throughout the entire combustion chamber. That is, a configuration is adopted so that an angle between the side face 118 and the upper end face 122 becomes a minimum angle α at a certain portion in the eccentric direction (θ=0 degrees or 360 degrees) of the cavity 112, and the angle gradually increases in accordance with an increase in distance from the eccentric direction, and on the opposite side (θ=180 degrees) to the eccentric direction, the angle between the side face 118 and the upper end face 122 becomes a maximum angle β.

In the example shown in FIG. 7, the conical protruding portion 216 of the bottom face 214 of the cavity 212 is formed so as to deviate from the cavity center C2. On the other hand, the center of a boundary line 212a between the side face 218 of the cavity 212 and an upper end face 222 is configured so as to match the cylinder center axis C1 when viewing the cavity 212 from the upper side. That is, according to the combustion chamber structure illustrated in FIG. 7, the width between a center C3 of the conical protruding portion 216 and the side face 218 is a smallest distance L2 at a certain portion on an extension of the eccentric direction of the conical protruding portion 216, and gradually lengthens in accordance with an increase in distance from the eccentric direction and reaches a largest distance L1 on an opposite side to the eccentric direction. Thus, the squish area width W is made uniform throughout the entire combustion chamber.

By making the size of the squish area equal throughout the entire combustion chamber as in the configurations illustrated in FIGS. 6 and 7, it is possible to reduce cooling loss and also reduce the amount of smoke emission.

Further, in the examples shown in FIGS. 6 and 7 a configuration is illustrated in a case where a connecting portion between the side face 118 and the upper end face 122 or a connecting portion between the side face 218 and the upper end face 222 is formed in an angulated edge shape. However, the present invention is not limited thereto, and a connecting portion between the side face 118 or 218 and the upper end face 122 or 222 may be a portion that has been processed in a round shape. It is thereby possible to suppress a rise in temperature at the edge portion even more effectively to improve the cooling loss and inhibit deformation or melt loss that is caused by thermal stress of the piston 10.

Embodiment 2

FIG. 8 is a view for describing a piston according to Embodiment 2 of the present invention. The piston illustrated in FIG. 8 is identical to the piston 10 illustrated in FIG. 1 and FIG. 2 except that the position of a center C4 of an outer edge portion 20a of the tapered portion 20 is different relative to the piston 10 illustrated in FIG. 1 and FIG. 2.

For example, in the combustion chamber in which the cavity 12 is formed eccentrically as in the combustion chamber configuration illustrated in FIG. 1 and FIG. 2, it is known that even in areas in which the squish area volume is the same, that is, areas that are symmetrical with respect to the eccentric direction, the velocity of a swirl flow increases in a downstream part of the swirl flow.

Therefore, in the present Embodiment 2 also, the center C2 of the cavity 12 is formed eccentrically with respect to the center C1 of the cylinder. According to this configuration, the squish area width W is the same at portions that are mutually symmetrical with respect to the eccentric direction. In addition, according to the present Embodiment 2, the center C4 of the outer edge portion 20b of the tapered portion 20 is formed so as to be eccentric on the side of a region in which the swirl flow velocity increases. Consequently, when regions in which the squish area width W is the same and that are at symmetrical positions with respect to the eccentric direction are compared, a width X of the tapered portion 20 on the side of the region in which the swirl flow velocity is faster (third portion) will be greater than the width X of the tapered portion 20 on the side of the region in which the swirl flow velocity is slower (fourth portion).

More specifically, as shown in FIG. 8, in a case where a swirl flow arises from the lower part, the center C4 of the outer edge portion of the tapered portion 20 is made eccentric from the cylinder center axis C1 in a vertically upward direction (direction in which θ=90 degrees) with respect to a line segment (line segment of θ=0 degrees) that connects the center axis C1 and the cavity center C2. As a result, when the portions that have the same squish area width are compared, the width of the tapered portion 20 is larger in the portion in which the swirl flow velocity increases (third portion). Therefore, a larger squish area volume can be secured in the region in which the swirl flow velocity increases.

The flow of gas inside the cylinder can be homogenized by securing a large squish area volume in the flow velocity direction in this manner. It is thereby possible to improve the mixed state of the air-fuel mixture and improve the cooling loss.

Note that according to the present Embodiment 2 a case has been described in which the center C4 of the outer edge portion 20b of the tapered portion 20 is made eccentric from the cylinder center axis C1 in a direction in which θ=90 degrees. However, the present invention is not limited thereto, and it is sufficient to adopt a configuration in which the tapered portion 20 is caused to deviate so that when portions that have the same squish area width W are compared, the width X of the tapered portion 20 on the side of a portion at which the swirl flow velocity increases is wider.

Further, a change with respect to the width X of the tapered portion 20 in the present invention is not limited to one in which the width X gradually changes in the direction of the swirl flow velocity, as described in the above Embodiment 1. For example, a configuration may also be adopted so that in a case where two or more regions with respect to which a large difference is liable to arise in the swirl flow velocity are identified and tapered portions having the same squish area widths are compared between such regions, the widths of the tapered portions are varied in a stepwise manner so that the width of a tapered portion within a region in which the swirl flow velocity is faster is wider. The same also applies to the embodiment described below.

In addition, according to the present Embodiment 2, a case has been described in which, by varying the width of the tapered portion 20, the squish area volume of a region in which the swirl flow velocity is faster is made relatively larger. However, the present invention is not limited thereto, and a configuration may also be adopted in which the tapered portion depth is varied gradually or in a stepwise manner so that, when regions having the same squish area width are compared, the tapered portion depth H is deeper in a region in which the swirl flow velocity is faster. Furthermore, the present invention may be a configuration obtained by combining the foregoing configurations or in which both the width of the tapered portion 20 and the tapered portion depth are varied. The same also applies to the embodiment described below.

Embodiment 3

FIG. 9 is a view that illustrates a piston according to Embodiment 3 of the present invention. The piston 10 illustrated in FIG. 9 is used in cylinders in which two intake valves are provided, respectively, in which the diameters of the intake valves are different. The piston 10 shown in FIG. 9 is identical to the piston 10 shown in FIG. 1 and FIG. 2 except that, in the top face thereof, valve recesses 40 are formed that correspond to the intake valves of differing diameters, and that the position of the center C4 of the outer edge portion 20a of the tapered portion 20 is shifted relative to the piston 10 shown in FIG. 1 and FIG. 2.

In this case the valve recesses are hollows in the piston top part that are provided to prevent the occurrence of interference between the intake valves and the piston top part when the intake valves open. According to the combustion chamber of the present Embodiment 3, it is assumed that a swirl flow arises in the arrow direction from the lower part to the upper part on the paper surface. As described above, the flow velocity on the downstream side of the swirl flow increases in comparison to the flow velocity on the upstream side of the swirl flow. In this case, an intake valve having a small diameter is installed on the upstream side of the swirl flow, and an intake valve having a large diameter is installed on the downstream side of the swirl flow.

As shown in FIG. 9, in the piston top part, a small recess 40a that corresponds to the intake valve that has the small diameter is formed on the upstream side of the swirl flow. Further, a large recess 40b that is larger than the small recess 40a and that corresponds to the intake valve that has the large diameter is formed on the downstream side of the swirl flow. By providing the large recess 40b on the downstream side of the swirl flow in this manner, the flow of the air-fuel mixture can be attenuated on the large recess 40b side and the flow of gas inside the cylinder can be homogenized.

In addition, according to the present Embodiment 3, similarly to Embodiment 2, the center C4 of the outer edge portion 20b of the tapered portion 20 is made eccentric on the side of the large recess 40b that is the downstream side of the swirl flow. More specifically, the tapered portion 20 is formed so that the center C4 of the outer edge portion 20b of the tapered portion 20 is located at an eccentric position relative to the cylinder center axis C1 in a vertically upward direction (direction in which θ=90 degrees) with respect to a line segment connecting the cylinder center axis C1 and the cavity center C2. Thus, when comparing the regions having the same squish area width, the width of the tapered portion 20 is greater on the side on which the large recess 40b is provided, and a larger squish area volume can be secured on that side. Therefore, the amount of residual air can be reduced on the side of the large recess 40b and the air utilization rate can be improved.

In Embodiment 3 that has been described above, a case is described in which the outer edge portion a of the tapered portion 20 is made eccentric on the side of the large recess 40b, and the volume of the squish area 30 is larger on the large recess 40b side. However, the present invention is not limited thereto, and a configuration may also be adopted in which the center of the outer edge portion 20b is not made eccentric on the large recess 40b side. That is, a configuration may also be adopted so that, when regions having the same squish area width W are compared, excluding a difference in volume that corresponds to the amount of the hollow for the valve recesses, the same volume of the squish area 30 is secured on the large recess 40b side and the small recess 40a side.

Further, according to the present Embodiment 3, similarly to Embodiment 2, a case has been described in which the width of the tapered portion 20 is gradually changed by shifting the center C4 of the outer edge portion 20b in a direction perpendicular to the eccentric direction. However, the present invention is not limited thereto, and it is sufficient to adopt a configuration in which the squish area volume is changed gradually or in a stepwise manner so that when portions that have the same squish area width of the region formed by the large recess 40b and the region formed by the small recess 40a are compared, the squish area volume on the large recess 40b side is greater than the squish area volume on the small recess 40b side.

It is to be understood that even when the number, quantity, amount, range or other numerical attribute of an element is mentioned in the above description of the embodiments, the present invention is not limited to the mentioned numerical attribute unless it is expressly stated or theoretically defined. Further, structures and the like described in conjunction with the embodiments are not necessarily essential to the present invention unless expressly stated or theoretically defined.

DESCRIPTION OF REFERENCE NUMERALS

10 Piston
12 Cavity (concave portion)
14 Bottom face
14a Curved face
16 Protruding portion
18 Side face
20 Tapered portion
20a Curved face of tapered portion
20b Outer edge portion of tapered portion
20c Inner edge portion of tapered portion
22 Upper end face
22a Outer circumferential circle
30 Squish area
112, 212 Cavity
212a Boundary line
214 Bottom face
216 Protruding portion
118, 218 Side face
122, 222 Upper end face
230 Squish area
40a Small recess
40b Large recess
C1 Cylinder center axis
C2 Cavity center
C3 Protruding portion center
C4 Outer edge portion center

The invention claimed is:

1. A combustion chamber structure for an internal combustion engine, comprising:
   a concave portion that is formed in a piston top part in an eccentric manner relative to a cylinder center; and
   a tapered portion that is arranged so as to surround a circumference of the concave portion and also connects an upper end face of the piston top part and a side face of the concave portion,
   wherein a squish area width is a horizontal distance between an outer edge portion of the upper end face of the piston top part and an inner edge portion of the tapered portion,
   wherein in a case where two regions of the same squish area widths are compared, a center of an outer edge portion of the tapered portion is made eccentric with respect to the cylinder center so that a width in a horizontal direction of the tapered portion on a side of a region in which a swirl flow velocity becomes slow is smaller than a width in the horizontal direction of the tapered portion on a side of a region in which the swirl flow velocity becomes fast,
   wherein from a planar view of the piston top part, an eccentric direction of the outer edge portion of the tapered portion relative to the cylinder center is a direction perpendicular to a line segment connecting the cylinder center and a center of the concave portion, and
   wherein from the planar view of the piston top part, a width of the tapered portion in an eccentric side on an extended line passing through the center of the outer edge portion of the tapered portion and the cylinder center is larger than a width of the tapered portion on an extended line of the line segment.

2. The combustion chamber structure for an internal combustion engine according to claim 1, wherein the combustion chamber structure in which two intake valves have mutually different diameters comprises:
   two valve recesses having different diameters that are formed in the piston top part in correspondence with the two intake valves, respectively, wherein
   among the two valve recesses, a valve recess that has a larger diameter is arranged in a region in which a swirl flow velocity is faster in comparison to a valve recess that has a smaller diameter.

3. A combustion chamber structure for an internal combustion engine that is a combustion chamber structure in which two intake valves having mutually different diameters are arranged, comprising:
   two valve recesses having different diameters that are formed in the piston top part in correspondence with the two intake valves, respectively, wherein the two valve recesses are separate from each other;
   a concave portion that is formed in the piston top part in an eccentric manner relative to a cylinder center; and
   a tapered portion that is arranged so as to surround a circumference of the concave portion and also connects an upper end face of the piston top part and a side face of the concave portion, wherein
   a tapered portion volume that is a volume of a space formed between the tapered portion and a combustion chamber upper wall surface in a first portion of the piston top part is greater than a tapered portion volume in a second portion that is nearer than the first portion to an eccentric direction of the concave portion from a center of the cylinder,
   among the two valve recesses, a valve recess that has a larger diameter is arranged in a region in which a swirl flow velocity is faster in comparison to a valve recess that has a smaller diameter, and
   from a planar view of the piston top part, an eccentric direction of the outer edge portion of the tapered portion relative to the cylinder center is a direction perpendicular to a line segment connecting the cylinder center and a center of the concave portion, and
   wherein from the planar view of the piston top part, a width of the tapered portion in an eccentric side on an extended line passing through the center of the outer edge portion of the tapered portion and the cylinder center is larger than a width of the tapered portion on an extended line of the line segment.

\* \* \* \* \*